(12) United States Patent
Fang

(10) Patent No.: US 6,473,035 B2
(45) Date of Patent: Oct. 29, 2002

(54) SYSTEM AND METHOD FOR POINTING THE BORE-SIGHT OF A TERMINAL ANTENNA TOWARDS THE CENTER OF A SATELLITE STATION-KEEPING BOX IN THE GEO-STATIONARY ORBIT

(75) Inventor: Russell Fang, Potomac, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/962,369

(22) Filed: Sep. 25, 2001

(65) Prior Publication Data

US 2002/0060641 A1 May 23, 2002

Related U.S. Application Data

(60) Provisional application No. 60/236,839, filed on Sep. 29, 2000.

(51) Int. Cl.$^7$ .................................................. H01Q 3/00
(52) U.S. Cl. ........................................................ 342/359
(58) Field of Search ................................ 342/359, 354, 342/356

(56) References Cited

U.S. PATENT DOCUMENTS 5,592,176 A * 1/1997 Vickers et al. ............... 342/359
2002/0050953 A1 * 5/2002 Fang ........................... 342/359

* cited by examiner

*Primary Examiner*—Thomas H. Tarcza
*Assistant Examiner*—Fred H. Mull
(74) *Attorney, Agent, or Firm*—John T. Whelen; Michael Sales

(57) ABSTRACT

A system and method for pointing a non-tracking antenna in a geo-synchronous satellite-based communication system is provided. A satellite terminal antenna is initially pointed towards the target satellite by any desired method. The antenna bore sight is then aligned towards the center of a satellite station-keeping box for operational use. By pointing the antenna bore sight towards the center of the satellite station-keeping box, the largest excursion between the antenna's bore sight and the actual satellite position is no greater than half the diagonal of the satellite station-keeping box despite the fact that satellite will move within the satellite station-keeping box's outer limits after the installation of the non-tracking antenna.

21 Claims, 4 Drawing Sheets

SYSTEM AND METHOD FOR POINTING THE BORE-SIGHT OF A TERMINAL ANTENNA TOWARDS THE CENTER OF A SATELLITE STATION-KEEPING BOX IN THE GEO-STATIONARY ORBIT

The present invention claims benefit under 35 U.S.C. section 119(e) of a provisional U.S. Patent Application of Russell J. Fang entitled Method and Apparatus for Satellite Terminal Antenna Pointing and Satellite Terminal Monitoring Techniques, Serial No. 60/236,839 filed Sep. 29, 2000, the entire contents of said provisional application being incorporated herein by reference.

BACKGROUND OF THE INVENTION

1. Field of the Invention

The present invention relates generally to a system and method for pointing the bore sight of a non-tracking antenna towards the center of a satellite station-keeping box. More particularly, by pointing the bore sight towards the center of the satellite station-keeping box, the largest excursion between the antenna's bore sight and the actual satellite position is no greater than half the diagonal of the satellite station-keeping box.

2. Brief Description of the Related Art

Typically, installing a non-tracking satellite terminal (ST) antenna in a geo-synchronous satellite system requires knowledge of the desired satellite location on the geo-synchronous orbital arc and its elevation and azimuth angles relative to the ST location. The installer performs an initial search by pointing the antenna toward the direction of the target satellite until sufficient satellite signal power is received to declare the successful acquisition of the target satellite. Once the target satellite is acquired, the installer first performs a coarse antenna pointing optimization by peaking the strength of the received signal and noting this position at the antenna pointing mechanism. The installer then uses the bracketing technique to align the antenna bore sight to the satellite with fine adjustments in elevation and azimuth. The bracketing technique entails having the installer mechanically dither the antenna pointing in such a manner that, when the antenna bore sight is pointed at the satellite, the signal strength at a fixed amount away from the bore sight in azimuth/elevation registers the same measured amount. This is based on the fact that the antenna gain rolloff (in dB) can be approximated by a parabola both in azimuth and in elevation relative to the antenna bore sight.

Employing the mechanical bracketing method for fine elevation adjustment, the installer points the antenna away from the initially noted position on the pointing mechanism on either side until the measured signal strength is $\alpha$ dB less (e.g., usually $\alpha=3$ for C and Ku band terminals; whereas for Ka band terminal, $\alpha=6$ may be used). The installer records the amount of adjustments on both sides of this noted position on the antenna pointing mechanism for achieving the $\alpha$ dB less signal strength. If the amount of adjustment is not the same, then the installer adjusts the antenna pointing in the direction of the lower signal strength reading. The installer repeats this fine elevation adjustment process or dithering until the adjustments on both sides are exactly the same. At this point the fine elevation adjustment process is complete and the elevation of the bore sight is considered to be aligned to the satellite. Then, this fine elevation adjustment process is repeated for fine azimuth adjustment until the fine azimuth adjustment is completed. At this point the antenna is left untouched for operational use despite the fact that the satellite will eventually move away from its current position.

A satellite at its assigned geo-synchronous orbital location is not really stationary relative to the earth's center fixed coordinate. This is due to the fact that the earth is not really an ideal sphere. In fact, it is more like an ellipsoid. As a consequence the satellite will move in altitude, azimuth and elevation relative to any fixed ST terminal location on the earth surface even though it is supposed to rotate synchronously with the earth's rotation around its own axis. Station keeping thrusters must be used to keep the satellite within a box around its assigned orbital location. The supposedly stationary satellite actually moves around any where inside the 3-dimensional (Az, El, and ALT) cube. However, from the ST antenna pointing perspective, the altitude of the satellite is of less importance when compared to azimuth and elevation. So, for ST antenna pointing, the satellite position within the AZ and EL 2-dimensional box during and after installation is of importance. The ST antenna gain pattern around its bore sight rolls off approximately in Gaussian shape (and parabolic in dB), less signal strength is received by the satellite when it moves away from the ST antenna bore sight. Similarly, the ST receives less power from satellite transmisson when the satellite drifts away from the bore sight of the ST receiving antenna. At the time of installation, the actual satellite position can be any where inside the (Az, EL) station keeping box. It may be at a corner of the satellite station-keeping box, and at a later time the satellite may drift to the opposite corner. In this case, loss of signal power would be the largest, since the angular distance between the terminal antenna bore-sight and the actual satellite position would be the greatest, in the amount of the full diagonal of the satellite station-keeping box. If the actual satellite position at the time of installation is some where else inside the box, the loss in signal power is less.

To compensate for such signal power loss due to satellite motion and ST initial antenna pointing, margins must be built into the system designed to offset the antenna gain reductions due to non-perfect satellite station keeping, by using a higher terminal transmit EIRP (Effective Isotropic Radiated Power) and receive G/T. Both of which would have the undesirable consequences of requiring larger antenna size, higher amplifier power, lower receiver noise temperature, and ultimately higher terminal costs. The required margins for the conventional means of terminal antenna pointing are dictated by the worst-case scenario as cited above. That is, the satellite is at one corner of the box at the time of terminal installation when the antenna bore sight is aligned to the actual satellite position. At some later time the satellite moves away to the far corner.

On the other hand, it is desirable to align the ST terminal antenna bore sight to the center of the box regardless of the actual satellite position at the installation time, then the maximum signal loss can be drastically reduced, particularly for large non-tracking terminals. This is accomplished by taking advantage of the fact that the satellite position relative to the terminal bore sight can never exceed half the diagonal distance of the box regardless where the satellite is inside the box at any future time. Therefore, a need exists for an antenna pointing system and method wherein the antenna terminal is initially pointed toward the satellite station-keeping box center, thus allowing the largest error between the terminal antenna bore-sight and the actual satellite position to be no more than one half the diagonal of the satellite station-keeping box.

In addition, in conventional antenna positioning systems, after an installer has completed the tedious pointing exercise, he often discovers he has acquired the wrong satellite. This is due to the fact that the identification information of the satellite is obtained after completion of the additional tedious commissioning process for the terminal over and above what has already been a complicated antenna pointing exercise. As a consequence, the installer often times needs to redo the tedious antenna pointing process again and again until he has acquired the right satellite. Accordingly, it is highly desirable to have the ability to know whether the acquired satellite is the target satellite, without the need to go through the tedious terminal commissioning process. Therefore, a need exists for the use of satellite specific unique words to provide satellite identity without going through the tedious commissioning process. That is, once a satellite is acquired through the antenna pointing process, it should be almost certain that the true target satellite is acquired, and not any other neighboring satellites. The probability of acquiring the wrong satellite should be practically nil, say less than $10^{-10}$. The conventional method does not have such a capability.

In addition, the integrity of any antenna pointing method or system is judged by its sensitivity to five major sources of antenna pointing errors comprising:
(1) the inaccuracy of measured signal strength,
(2) the signal distortion caused by rain attenuation and atmospheric scintillation,
(3) the inaccuracy of the antenna pointing mechanism itself,
(4) the inaccuracy of the antenna pointing by the installer, and
(5) the effect of satellite movement within its station-keeping box.

Conventional methods employ the actual signal power to indicate signal strength which can vary widely from equipment to equipment and also can vary with the propagation condition of the satellite-to-terminal path particularly at Ka band. The resulting error signal necessary for antenna pointing control can be quite inaccurate, thereby rendering accurate antenna pointing impractical and in some cases impossible. The errors caused by items (3) through (5) above, while important, are common to the current method and hence will not be discussed in greater details.

SUMMARY OF THE INVENTION

The above described disadvantages are substantially overcome and advantages realized by a system and method for positioning an antenna adapted to receive a signal from at least one satellite in a communications network. The satellite position area in which the satellite is expected to be present is called the satellite station-keeping box which is divided into a plurality of regions. A satellite terminal coupled to the antenna is adapted to compute the distance measurement between the actual satellite position and a central position within the satellite station-keeping box. Upon computing the distance measurement the antenna is further adapted to point toward the central location of the satellite position area thereby decreasing the error despite the satellite movement within the satellite station-keeping box.

The above disadvantages are also substantially overcome by providing a method for positioning a satellite terminal antenna adapted to receive a signal from the satellite in a communications network. This method comprises identifying a satellite position area in which the satellite is expected to be present, and dividing that area into a plurality of regions. Then, identifying a first signal, at a first location by pointing from the satellite terminal antenna toward the satellite located within one of the regions of the satellite position area. Then, computing a satellite position error by determining a difference between the first location and a point located substantially central to the satellite position area. Finally, adjusting the first signal by an amount of the satellite position error.

BRIEF DESCRIPTION OF THE DRAWINGS

These and other aspects, advantages and novel features of the invention will be more readily appreciated from the following detailed description when read in conjunction with the accompanying drawings, in which.

DETAILED DESCRIPTION OF THE PREFERRED EMBODIMENT

Figure 1:
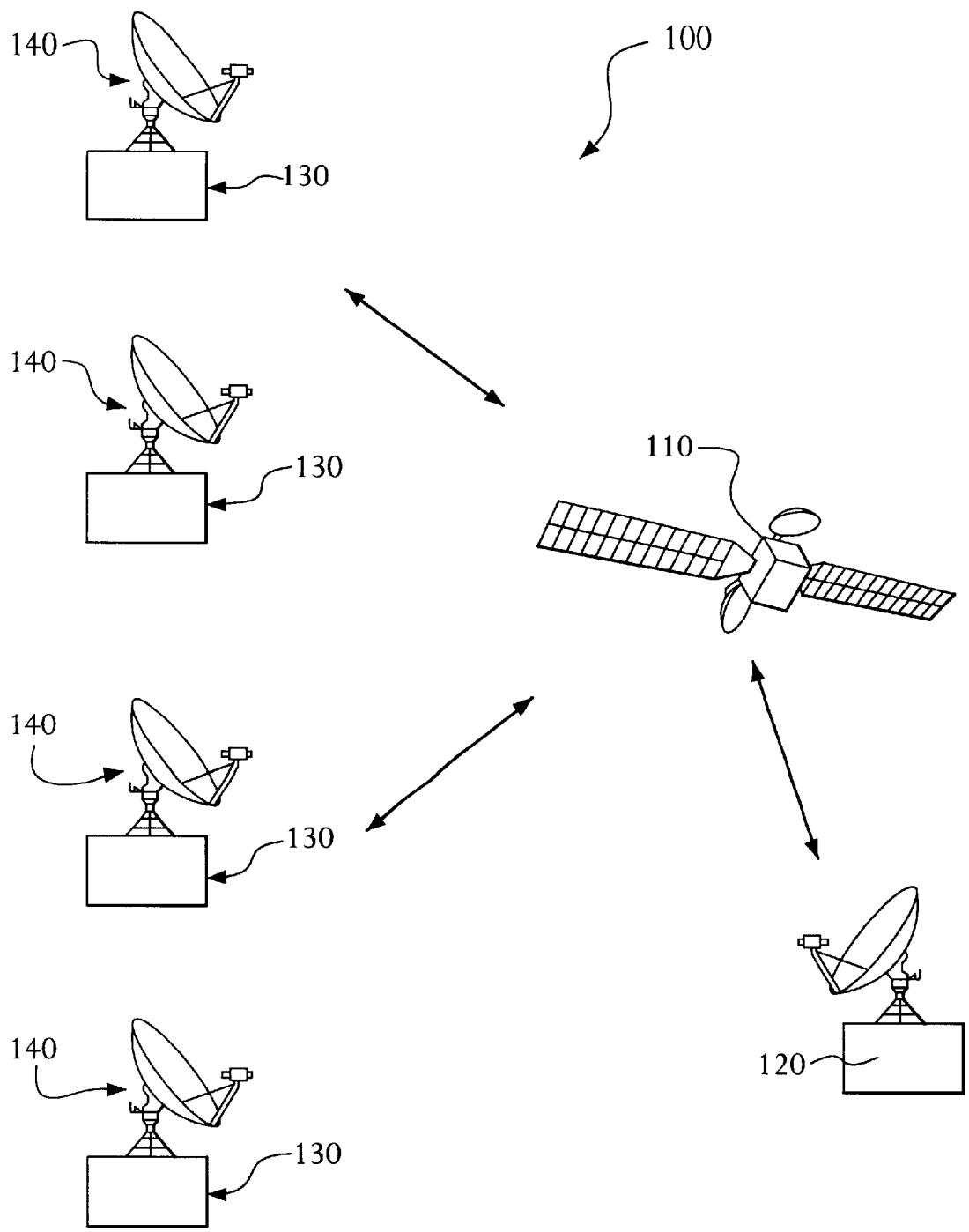
FIG. 1 is a block diagram overview of a satellite-based communication system employing a system and method according to an embodiment of the present invention.

FIG. 1 illustrates a geo-synchronous satellite communications network comprising a satellite 110, a network operations control center 120, and various satellite terminals 130 (ST) with corresponding non-tracking antennas 140. An installer initially points the antenna 140, located at the ST 130 toward the satellite 110 and adjusts the azimuth and elevation of the antenna 140 until the ST 130 receives the desired signal from the satellite for a maximum signal to noise ratio. The signal to noise ratio, or carrier-to-noise ratio (CNR), an indicator that is less sensitive to the gain of the signal transmission path, is employed in the present invention. However, as the satellite 110 moves within the predetermined station keeping box, the signal as received at a given location can have less than optimal power, thereby degrading the link performance.

Once initially positioned, the ST 130 acquires the satellite reference frequency and timing for achieving system synchronization by pre-compensating for the frequency and timing errors caused by the Doppler shift and range error. The ST 130 ensures that it has acquired the correct servicing satellite 110 by determining the presence of a satellite-specific beacon unique word frame (UW) embedded within the received signal. The ST 130 receives the supervisory-contention channel assignment information (carrier frequency and timeslot) from the payload control computer on board the satellite 110 in order to send probing bursts to the satellite 110 for completing the timing synchronization process.

As discussed previously, the gain in dB scale of a circularly symmetric antenna can be approximated by a parabolic equation near the bore-sight of its main beam. The pointing loss L in dB can thus be approximated by the following parabolic equation:

$$L = 3 \cdot (\theta/B)^2 \quad (1)$$

where $\theta$ is the pointing error in degree relative to the target satellite position, and B is the angle between beam center and the half-power antenna gain in degrees. If the pointing loss of the receiving antenna is L dB at 20 GFz, then the pointing error $\theta$, of the transmitting antenna caused by pointing inaccuracy alone can be represented as $$\theta = B_r \cdot \sqrt{L/3} = \frac{30}{20} \sqrt{L/3} \cdot B_t \quad (2)$$

where $B_r$ and $B_t$ are angles between the beam center and the half-power antenna gain point of the receive and transmit antennas, respectively.

Figure 2A:
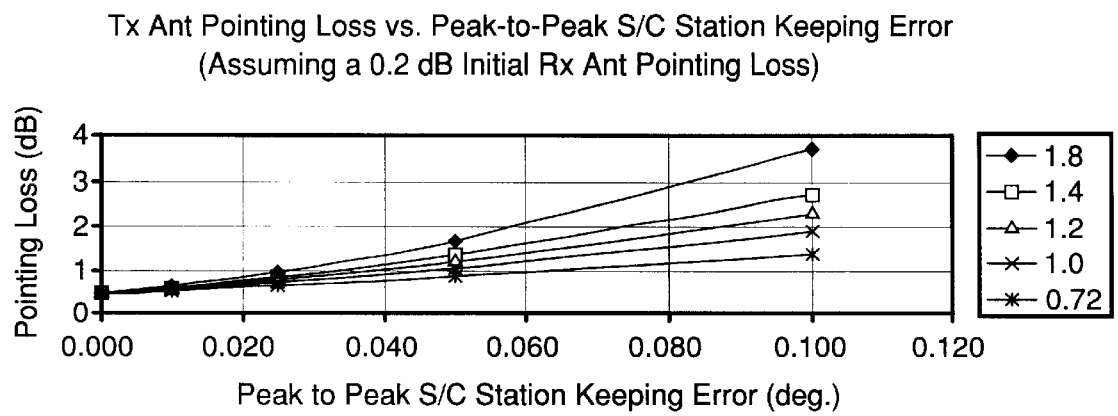
FIG. 2a is a graph depicting the sensitivity of the transmitting antenna pointing losses as a function of the size of the satellite station-keeping box for various terminal antenna sizes.
Figure 2B:
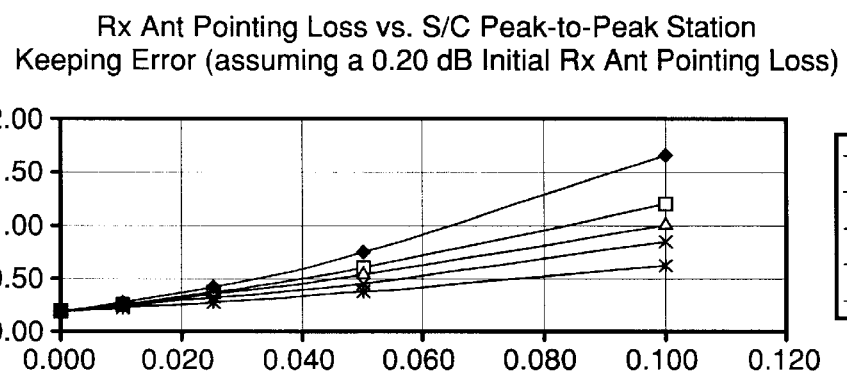
FIG. 2b is a graph depicting the sensitivity of the receiving antenna pointing losses as a function of the size of the satellite station-keeping box for various terminal antenna sizes.

Let e be the maximum angular distance in degrees between the ST antenna bore sight position at the initial installation time and any future satellite position in its station-keeping box. Then, the loss $L_t$ and $L_r$ of the transmit and receive antenna, both in dB can be approximated by the following equation, respectively:

$$L_t = 3 \cdot (1.5 \cdot \sqrt{L/3} + e/B_t)^2 \quad (3)$$

$$L_r = 3 \cdot (\sqrt{L/3} + e/B_r)^2 \quad (4)$$

where $B_t$ and $B_r$ are the half-power point of the gain pattern of the transmit and receive antenna, respectively. Assuming that the conventional method of pointing the antenna towards the actual satellite position at terminal installation time is used, the worst-case antenna pointing loss condition would be for the satellite to be initially at a corner of its station keeping box during installation and later on moves to the far cornet of the box. For a square box, the worst case e is the full diagonal distance. FIGS. 2a and 2b show respectively, the transmit and receive antenna pointing losses as a function of the size of the satellite station-keeping box for various terminal antenna diameters in meters. Here, L=0.2 dB is assumed. As seen in FIGS. 2a and 2b, the terminal antenna pointing loss can be quite sensitive to the satellite station keeping accuracy. Also, as the antenna size increases, the pointing loss increases as well.

Table 1, below, also illustrates the antenna pointing losses for several scenarios and antenna sizes. As in FIGS. 2a and 2b, among the scenarios shown is when the antenna bore sight is pointed towards the satellite itself. However, in contrast to FIGS. 2a and 2b, Table 1 also depicts scenarios when the antenna bore sight is pointed towards the center of the satellite station-keeping box, thus incurring smaller antenna pointing losses. Accordingly, if the bore sight is pointed towards the satellite, and not the satellite station-keeping box center, when the satellite drifts the excursions are significant as explained in detail below. As depicted in Table 1 below Scenario #1 has the antenna aligned to the center of a satellite station-keeping box of ±0.025° regardless of the actual satellite position during installation. For Scenario #2, the antenna is aligned to the actual satellite position, which is assumed at the corner of the same ±0.025° satellite station-keeping box during installation. Scenario #3, illustrates the antenna aligned to the center of a satellite station-keeping box of ±0.05° regardless of the actual satellite position during installation. Scenario #4 has the antenna aligned to the actual satellite position, which is assumed at the corner of the same station keeping box of ±0.05° during installation. All scenarios assume L=0.2 dB.

Comparing scenarios #1 and #2, if the antenna bore-sight is aligned towards the center of the station keeping box, then for a 1.8 m terminal the antenna pointing loss is reduced to 0.43 dB receive and 0.97 dB transmit from 0.75 dB receive and 1.69 dB transmit, respectively, with a station keeping box size of ±0.025. Comparing Scenarios #3 and #4, if the antenna bore-sight is aligned towards the center of the station keeping box, then the antenna pointing loss is reduced to 0.75 dB receive and 1.69 dB transmit from 1.65 dB receive and 3.74 dB transmit, respectively, for a 1.8 m terminal with a station keeping box size of ±0.05°. Comparing Scenarios #2 and #3, aligning the antenna bore-sight towards the center of the satellite station-keeping box is equivalent to reducing the box dimension by a factor of 2, so far as pointing loss is concerned. Accordingly, aligning the antenna bore-sight towards the center of the satellite station box facilitates reducing the terminal Effective Isotropic Radiated Power (EIRP) loss and G/T degradation for non-tracking antennas, particularly in Ka band.

TABLE 1

| | Antenna Pointing Losses (dB) | | | |
|---|---|---|---|---|
| ST Antenna Diameter, m | 0.72 (RX/TX) | 1.0 (RX/TX) | 1.2 (RX/TX) | 1.8 (RX/TX) |
| Br/Bt, degrees | 0.797/0.530 | 0.526/0350 | 0.439/0.292 | 0.292/0.194 |
| Scen. #1, ±0.025° e = 0.0354° | 0.28/0.62 | 0.32/0.72 | 0.35/0.78 | 0.43/0.97 |
| Scen. #2, ±0.025° e = 0.0707° | 0.36/0.81 | 0.46/1.04 | 0.53/1.19 | 0.75/1.69 |
| Scen. #3, ±0.05° e = 0.0707° | 0.36/0.81 | 0.46/1.04 | 0.53/1.19 | 0.75/1.69 |
| Scen. #4, ±0.05° e = 0.1414° | 0.57/1.28 | 0.83/1.88 | 1.01/2.28 | 1.65/3.74 |

It should be noted that the initial antenna pointing loss L depends on the accuracy of signal strength measurement. The conventional means of measuring signal power is not accurate due to various factors, for example, equipment limitation, signal variations, propagation anomalies such as scintillation and fades, among others. In an embodiment of the present invention, the signal source is a well controlled beacon signal from the satellite with ±0.5 dB peak to peak variation over the life of the satellite. The signal strength is measured in terms of beacon carrier-to-noise ratio (CNR) instead of the actual power, accordingly it is independent of the receiving chain gain variations as would be the case for power indicator employed in the conventional method. In addition, satellite-specific unique words (UWs) are embedded in the beacon signal design, which allows unique identification of the desired target satellite. A UW is also an integral part of the satellite synchronization system design and is a source for satellite signal acquisition and signal strength measurement during antenna installation. All transmission from other satellites appears as noise to the desired ST under installation when the satellite-specific beacon unique words are embedded within the received signal at the antenna.

Figure 3:
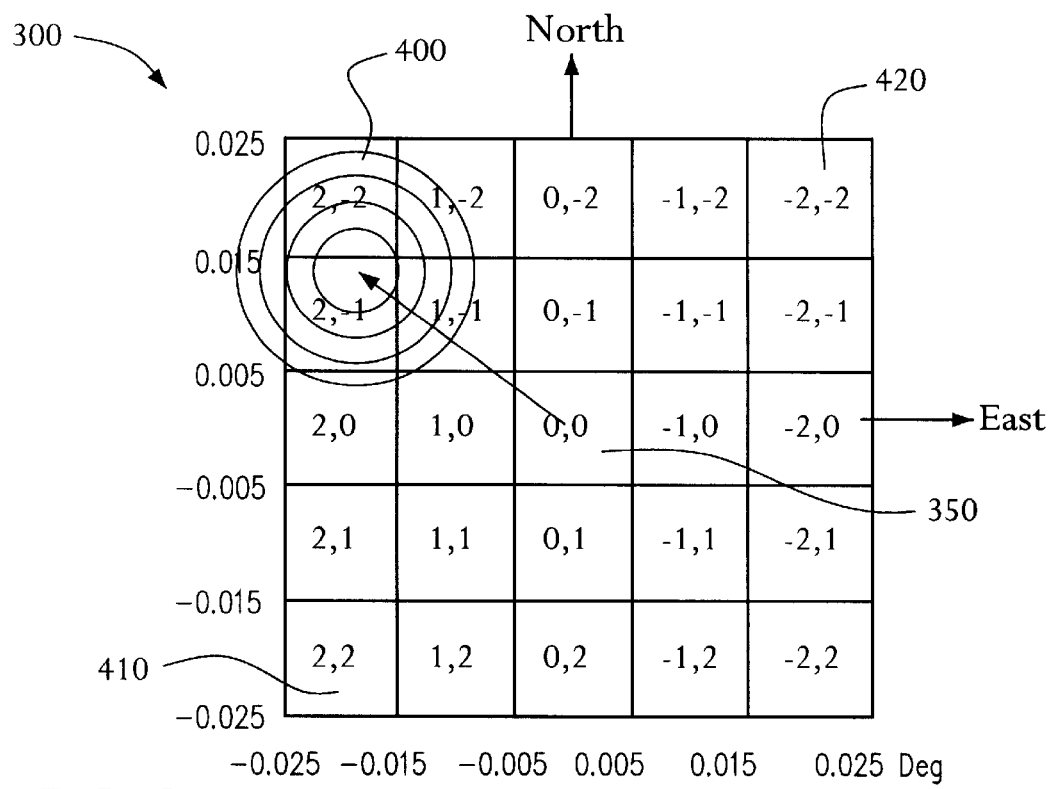
FIG. 3 is illustrative of a circularly symmetric antenna pattern relative to the satellite station-keeping box in accordance with an embodiment of the present invention.

Now referring to FIG. 3, the satellite station-keeping box 300 has a circularly symmetric antenna pattern 400, (which is produced by a circularly symmetric ST antenna aperture), imposed upon the box 300. An embodiment of the present invention employs pointing and aligning the ST 130 antenna bore sight with the desired satellite by any conventional method, for example, the bracketing technique described above. Next, the ST 130 obtains the satellite position data via a multicast transmission information packet from the payload. With the received satellite position data, the terminal knows the angular error vector between the current satellite position during installation and the desired satellite position of the box center. The installer can apply a correction to the ST antenna pointing in the opposite direction of this error vector, i.e., making a negative azimuth and a negative elevation correction to nullify the error, thereby aligning the antenna bore sight to the center of the box. In practice, the ST 130, of the first embodiment of the present invention, quantizes the satellite station keeping box into N×N (e.g., N=5) equal size bins. In this case, only a discrete number of azimuth and elevation corrections will be necessary. The net effect is to correct the antenna pointing with only a finite number of azimuth and elevation discrete positions in the antenna pointing mechanism, which would be much simpler to implement. In any event, the antenna bore sight can be easily aligned to the box center 350. By pointing the non-tracking antenna 130 towards the box center 350 at installation, the antenna 130 is in the most optimum position within the satellite station-keeping box 300, despite the fact that the satellite may later on move to other locations inside the box after the installation.

For example, consider the case where the satellite 110 is initially positioned somewhere in bin 400 of the satellite station-keeping box 300 at the terminal installation time and the antenna 130 is pointed towards the center bin 350 by using the method as described. As the satellite drifts toward bin 410 at some later time, the error distance from the satellite 110 to the antenna pointing position at box 350 is fixed and is no larger than half the diagonal of the box. It is important to note that with an embodiment of the present invention, even the satellite 110 drifts throughout the satellite station-keeping box 300, the bore sight of the terminal antenna 130 is aligned towards the center 350 of the grid, not the satellite as is the case for the conventional method.

Figure 4:
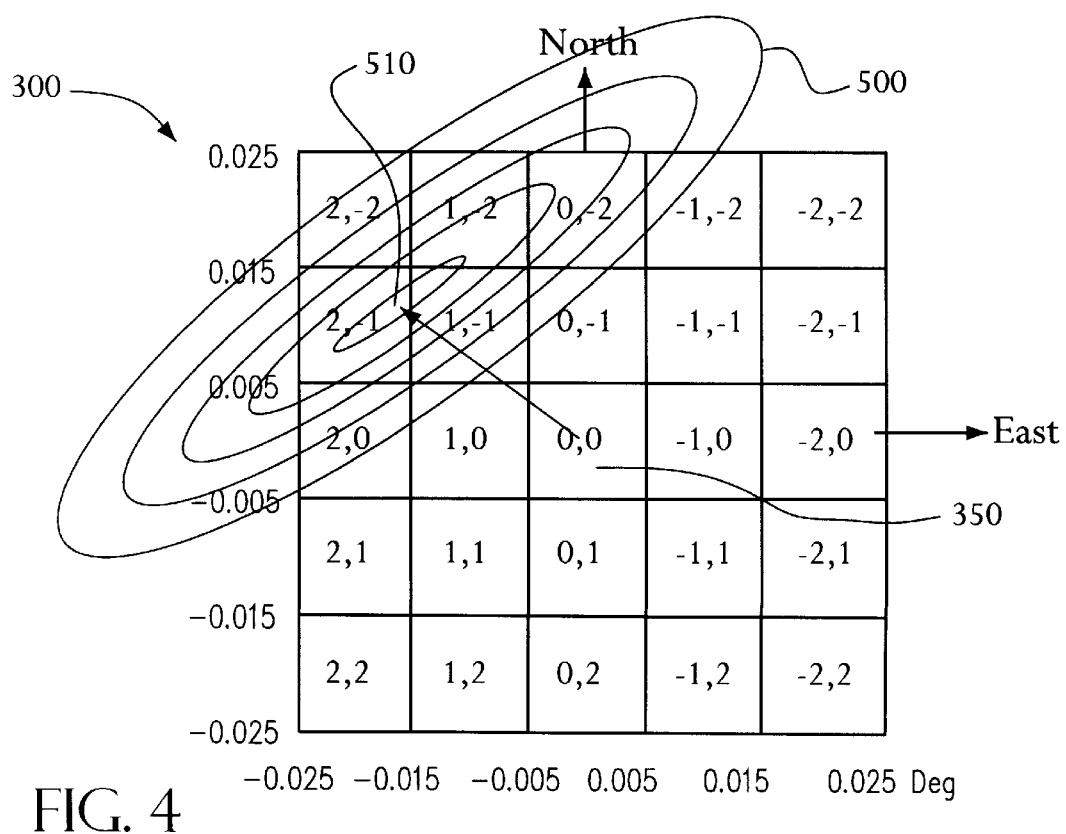
FIG. 4 is illustrative of a non-circularly symmetric antenna pattern relative to the satellite station-keeping box in accordance with an embodiment of the present invention.
Figure 5:
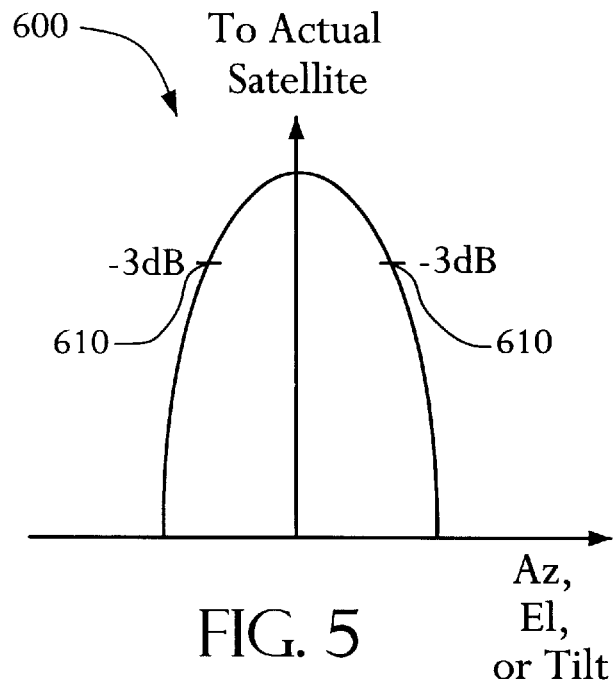
FIG. 5 is an approximation of antenna pattern near its bore sight with the 3 dB points on either side of the pattern delineated in accordance with a second embodiment of the present invention.

An embodiment of the present invention described above is for a circularly symmetric terminal antenna. The same method applies to non-circularly symmetric antennas as well with some modifications. As can be seen from FIG. 4, the antenna pattern for a non-circularly symmetric antenna is elliptic in shape, which is the consequence of the antenna aperture shape. (The major and minor axes of the pattern align with the minor and major axes of the antenna aperture shape, respectively.) The minor axis of the beam pattern needs to be aligned with the geo-synchronous satellite orbital arc so that the potential interference into the adjacent satellite is minimized. That means the major axis of the actual antenna aperture needs to be aligned to the geo-synchronous orbital arc. Accordingly, a similar process as discussed above is employed to point the antenna towards the center of the satellite station-keeping box despite the actual satellite's location during installation, except that an additional orbital arc alignment for the antenna is needed. The alignment of the major axis of the antenna to the orbital arc can be achieve by using the conventional means of mechanical bracketing, (i.e., dithering antenna tilt before proceeding to fine adjustments of elevation and azimuth). All other steps of the process are the same.

Figure 6:
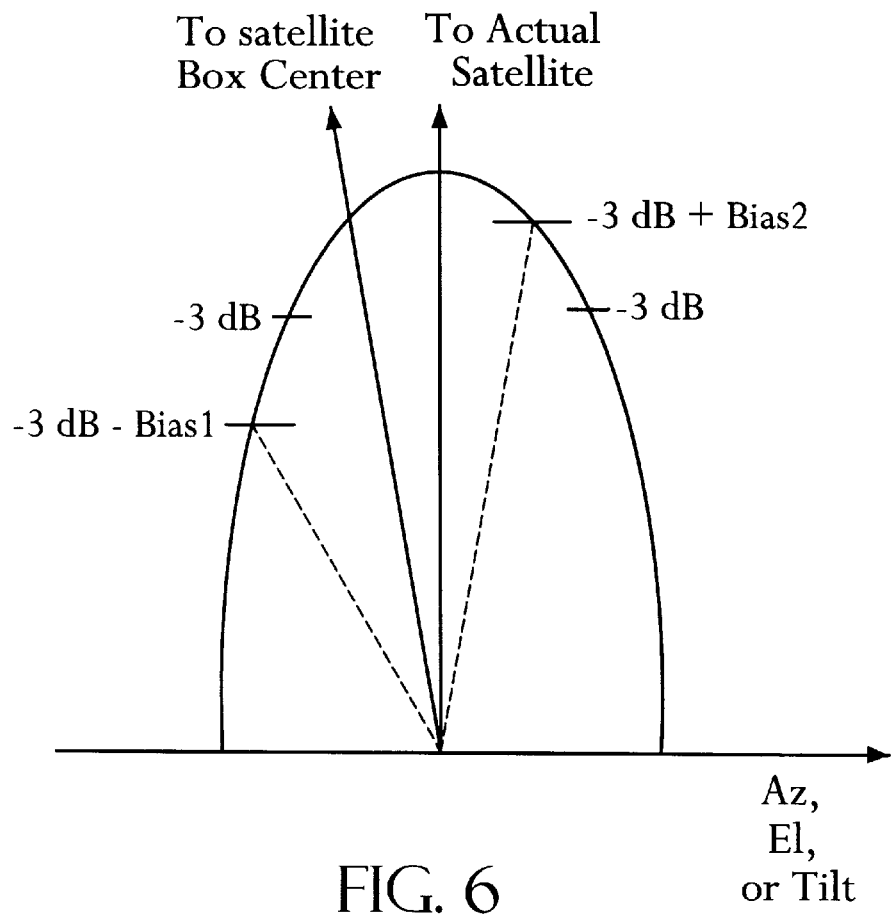
FIG. 6 is an antenna pattern with the bias adjusted 3 dB points of either side of the pattern constructed in accordance with a second embodiment of the present invention.

A second embodiment of the present invention described herein requires adding a predetermined bias to the beacon signal CNR received from the satellite 110 as shown in FIG. 6. Similar to the first embodiment, the second embodiment first employs the conventional mechanical bracketing method to align the antenna bore sight to the satellite at the installation time and marks the antenna pointing position on the pointing mechanism. From the received satellite position data via the multicast transmission system information, the terminal knows the error vector of satellite position relative to the box center. Instead of applying the azimuth and elevation corrections mechanically, which requires an accurate pointing mechanism. The terminal can compute the biases Bias1 and Bias2 in CNR on the outer side of the desired measurement point of $-\alpha$ dB (e.g., $\alpha=3$) from the antenna peak as shown in FIG. 6. For practical purpose, Bias1 and Bias2 can both be set equal to Bias. These biases correspond to the needed angular corrections in azimuth/elevation in order to bring the antenna bore sight in alignment with the box center from the current satellite position. These biases are built into the fine antenna pointing process using dithering. That is, instead of pointing away from the peak until the CNR drops to $-\alpha$ dB on both sides in the fine azimuth and elevation adjustments, the installer points the antenna away on one side until the CNR is $-\alpha-$Bias1 dB. The corresponding position is marked on the pointing mechanism. The installer then points the antenna away to the other side until the CNR is $-\alpha+$Bias2 dB and marks that corresponding position on the mechanism. The installer dithers the pointing such that the physical adjustment to reach the $-\alpha-$Bias1 dB reading on one side of the dithering is equal to the physical adjustment to reach the $-\alpha+$Bias2 dB reading on the other side of the dithering. At this point the antenna fine adjustments are complete and the antenna is left untouched for operational use.

Although only several exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for positioning a satellite terminal antenna adapted to receive a signal from at least one satellite in a communications network, said method comprising:

identifying a satellite position area in which said satellite is expected to be present, and dividing said satellite position area into a plurality of regions;

computing the distance measurement between said satellite position area and a first location; and positioning said satellite terminal antenna to point toward said first location of said satellite position area.

2. A method for positioning a satellite terminal antenna, as claimed in claim 1, wherein said first location is substantially corresponding to a center of said satellite position area.

3. A method for positioning a satellite terminal antenna, as claimed in claim 1, wherein said signal comprises a satellite specific unique word.

4. A method for positioning a satellite terminal antenna, as claimed in claim 1, wherein said plurality of regions includes a matrix of correction vectors of said satellite position area.

5. A method for positioning a satellite terminal antenna, as claimed in claim 1, wherein said signal has a signal to noise ratio $\alpha=3$ db less than a peak level of said received signal.

6. A method as claimed in claim 1, wherein said identifying step further comprises:

identifying a signal from said satellite at said satellite terminal antenna; and processing said signal when said signal comprises a unique word.

7. A method as claimed in claim 6, wherein said unique word corresponds to a target satellite within said communications network.

8. A method for positioning a satellite terminal antenna adapted to receive a signal from at least one satellite in a communications network, said method comprising:
- identifying a satellite position area in which said satellite is expected to be present, and dividing said satellite position area into a plurality of regions;
- identifying a first signal from said satellite at a first location by pointing said satellite terminal antenna toward said satellite located within said satellite position area;
- computing a satellite position error by determining a difference between said first location and a second location within said plurality of regions; and
- adjusting said first signal by said amount of satellite position error.

9. A method for positioning a satellite terminal antenna, as claimed in claim 8, wherein said second location includes a location substantially corresponding to a center location of one of said plurality of regions.

10. A method for positioning a satellite terminal antenna, as claimed in claim 8, wherein said satellite position error includes a measurement value in db for the azimuth and elevation adjustments.

11. A method for positioning a satellite terminal antenna as claimed in claim 8, wherein first said identifying step further comprises processing a signal from said satellite wherein said signal comprises a unique word.

12. A method for positioning a satellite terminal antenna as claimed in claim 11, wherein said unique word corresponds to a target satellite within said communications network.

13. A computer readable medium for positioning a satellite terminal antenna adapted to receive a signal from at least one satellite in a communications network, said medium comprising:
- a first set of instructions to identify a satellite position area in which said satellite is expected to be present, and dividing said satellite position area into a plurality of regions;
- a second set of instructions computing the distance measurement between said satellite located within said satellite position area and a first location; and
- a third set of instructions positioning said receiver to point toward said first location of said satellite position area.

14. A computer readable medium for positioning a satellite terminal antenna, as claimed in claim 13, wherein said plurality of regions includes a matrix of correction vectors of said satellite position area.

15. A computer readable medium for positioning a satellite terminal antenna, as claimed in claim 13, wherein said first location is substantially corresponding to a center of said satellite position area.

16. A computer readable medium for positioning a satellite terminal antenna, as claimed in claim 13, wherein said distance measurement includes elevation and azimuth of said satellite in relation to said satellite terminal antenna.

17. A computer readable medium for positioning a satellite terminal antenna, as claimed in claim 13, wherein said plurality of regions includes a matrix of correction vectors of said satellite position.

18. A computer readable medium for positioning a satellite terminal antenna, as claimed in claim 13, wherein said first set of instructions further comprises processing a signal from said satellite wherein said signal comprises a unique word corresponding to a target satellite within said communications network.

19. A computer readable medium for positioning a satellite terminal antenna adapted to receive a signal from at least one satellite in a communications network, said computer readable medium comprising:
- a first set of instructions identifying a satellite position area in which said satellite is expected to be present, and dividing said satellite position area into a plurality, of regions;
- a second set of instructions identifying a first signal from said satellite at a first location by pointing said satellite terminal antenna toward said satellite located within said satellite position area;
- a fourth set of instructions computing satellite position error value by determining a difference between said first location and a second location;
- a fifth set of instructions adjusting said first signal by said satellite position error value.

20. A system for positioning an antenna adapted to receive a signal from at least one satellite in a communications network, said system comprising:
- a satellite terminal antenna; and
- processing device coupled to said satellite terminal antenna, adapted to compute the distance measurement between said satellite position area in which said satellite is expected to be present, and wherein said satellite position area is divided into a plurality of regions and a first location, and said processing device further adapted to position said receiver to point toward said first location of said satellite position area.

21. A system as claimed in claim 20, wherein said first location is substantially corresponding to a center of said satellite position area.

* * * * *